(12) United States Patent
Lee et al.

(10) Patent No.: US 11,050,104 B2
(45) Date of Patent: Jun. 29, 2021

(54) BATTERY PACK AND AUTOMOBILE COMPRISING SAME

(71) Applicant: LG Chem, Ltd., Seoul (KR)

(72) Inventors: Gyo-Eun Lee, Daejeon (KR); Seong-Tae Kim, Daejeon (KR); Eui-Hoon Myung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 121 days.

(21) Appl. No.: 16/481,266

(22) PCT Filed: Jul. 23, 2018

(86) PCT No.: PCT/KR2018/008293
§ 371 (c)(1),
(2) Date: Jul. 26, 2019

(87) PCT Pub. No.: WO2019/039744
PCT Pub. Date: Feb. 28, 2019

(65) Prior Publication Data
US 2020/0044204 A1    Feb. 6, 2020

(30) Foreign Application Priority Data
Aug. 22, 2017 (KR) ................. 10-2017-0106049

(51) Int. Cl.
*H01M 50/169*   (2021.01)
*H01M 50/20*    (2021.01)

(52) U.S. Cl.
CPC ......... *H01M 50/169* (2021.01); *H01M 50/20* (2021.01)

(58) Field of Classification Search
CPC ........................... H01M 50/20; H01M 50/169
See application file for complete search history.

(56) References Cited

U.S. PATENT DOCUMENTS

| | | | |
|---|---|---|---|
| 4,828,943 A | 5/1989 | Pritchard | |
| 5,605,549 A * | 2/1997 | Zucker | H01M 10/10 29/623.1 |
| 5,611,149 A | 3/1997 | Fujiwara | |
| 2005/0136323 A1 | 6/2005 | Sugimune et al. | |
| 2006/0134511 A1* | 6/2006 | Ito | H01M 10/488 429/90 |
| 2008/0286639 A1 | 11/2008 | Yusa et al. | |
| 2009/0092860 A1 | 4/2009 | Yamamoto et al. | |

(Continued)

FOREIGN PATENT DOCUMENTS

| | | |
|---|---|---|
| GB | 1 569 410 A | 6/1980 |
| JP | 2008-186712 A | 8/2008 |

(Continued)

OTHER PUBLICATIONS

Extended European Search Report dated Apr. 28, 2020, for European Application No. 18847458.9.

*Primary Examiner* — Olatunji A Godo
(74) *Attorney, Agent, or Firm* — Birch, Stewart, Kolasch & Birch LLP

(57) ABSTRACT

Disclosed is a battery pack, which includes: a battery module having at least one battery cell; a pack case having a case body for accommodating the battery module and a case cover configured to be welded to the case body to package the battery module; and at least one weld quality indicator provided on the case body of the pack case to inspect accuracy of welding.

9 Claims, 8 Drawing Sheets

(56) References Cited

U.S. PATENT DOCUMENTS

| | | | |
|---|---|---|---|
| 2011/0151297 A1* | 6/2011 | Shimizu | ............ H01M 50/213 |
| | | | 429/94 |
| 2014/0072853 A1 | 3/2014 | Won et al. | |
| 2018/0034012 A1 | 2/2018 | Yu et al. | |

FOREIGN PATENT DOCUMENTS

| | | |
|---|---|---|
| JP | 2008-287993 A | 11/2008 |
| JP | 2011-90861 A | 5/2011 |
| JP | 4869592 B2 | 2/2012 |
| JP | 2016-207412 A | 12/2016 |
| JP | 2017-084653 A | 5/2017 |
| KR | 10-0786757 B1 | 12/2007 |
| KR | 100885941 B1 | 2/2009 |
| KR | 10-2009-0056600 A | 6/2009 |
| KR | 10-2013-0069382 A | 6/2013 |
| KR | 10-2013-0140283 A | 12/2013 |
| KR | 10-1357223 B1 | 2/2014 |
| KR | 10-2015-0049984 A | 5/2015 |
| KR | 10-2017-0010666 A | 2/2017 |

\* cited by examiner

BATTERY PACK AND AUTOMOBILE COMPRISING SAME

CROSS-REFERENCES TO RELATED APPLICATIONS

This application is a U.S. national phase application, pursuant to 35 U.S.C. § 371, of PCT/KR2018/008293, filed Jul. 23, 2018, designating the United States, which claims priority to Korean Application No. 10-2017-0106049, filed Aug. 22, 2017. The entire contents of the aforementioned patent applications are incorporated herein by this reference.

TECHNICAL FIELD

The present disclosure relates to a battery pack, and a vehicle including the battery pack.

BACKGROUND ART

Secondary batteries which are highly applicable to various products and exhibit superior electrical properties such as high energy density, and the like are commonly used not only in portable devices but also in electric vehicles (EVs) or hybrid electric vehicles (HEVs) powered by electrical power sources. The secondary battery is drawing attentions as a new energy source not only due to a primary advantage that the use of fossil fuels may be significantly reduced, but also due to improved environment friendliness and energy efficiencies, and due to no byproduct generated during the energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5 V to 4.6 V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set based on the required output voltage or the demanded charge/discharge capacity.

Meanwhile, when a plurality of battery cells are connected in series or in parallel to configure a battery pack, it is common to configure a battery module composed of at least one battery cell first, and then configure a battery pack using at least one battery module and adding other components. The battery cells configuring the battery module or the battery pack are generally pouch-type secondary batteries that may be easily stacked on one another.

A conventional battery pack includes a battery module having at least one battery cell, and a pack case for packaging the battery module. The pack case includes a case body for accommodating the battery module, and a case cover welded to the case body to package the battery module.

In the conventional battery pack, the weld quality for the welding work is related to the seal of the pack case, and thus, inspecting the weld quality between the case body and the case cover is an important factor in the welding process.

In the conventional technique, the weld quality is inspected from the melting height of the welding surface between the case body and the case cover. The height may be checked using a separate sensor or other equipment.

However, the process of inspecting the weld quality using such a separate sensor or the like is performed as a separate process after the welding work, thereby increasing the cost due to the addition of the process equipment and extending the process time.

Moreover, when the weld quality is inspected in the conventional battery pack, since the entire welding surface is not uniformly melted, it is difficult to determine an accurate dimension only by the qualitative judgment of a worker through the sensor or the like.

DISCLOSURE

Technical Problem

Therefore, the present disclosure is directed to providing a battery pack, which may more easily check the weld quality of a pack case during a welding process, and a vehicle including the battery pack.

In addition, the present disclosure is also directed to providing a battery pack, which may quantitatively determine the weld quality of a pack case during a welding process, and a vehicle including the battery pack.

Technical Solution

In an aspect of the present disclosure, there is provided a battery pack, comprising: a battery module having at least one battery cell; a pack case having a case body for accommodating the battery module and a case cover configured to be welded to the case body to package the battery module; and at least one weld quality indicator provided on the case body of the pack case to inspect accuracy of the welding.

The case cover may be coupled to an upper rim of the case body by welding, and the at least one weld quality indicator may be formed at the upper rim of the case body.

At least one of height and slope of the case cover may be changed along a lower side of the case body by the welding, and the at least one weld quality indicator may allow the changed height and/or slope of the case cover to be inspected by a vision of a user.

The at least one weld quality indicator may include a plurality of engraved dimensional marks formed with a predetermined length along a horizontal direction of the case body.

The plurality of engraved dimensional marks may be disposed to be spaced apart from each other by a predetermined distance along a vertical direction of the case body.

The plurality of engraved dimensional marks may be formed to have at least two different lengths.

The engraved dimensional marks having different lengths may be arranged alternately.

The plurality of engraved dimensional marks may be provided as inscribed grooves formed with a predetermined depth at the case body.

The weld quality indicator may be provided in plural, and the plurality of weld quality indicators may be disposed to be spaced apart from each other by a predetermined distance along the upper rim of the case body.

In another aspect of the present disclosure, there is also provided a vehicle, comprising at least one battery pack according to the above embodiments.

Advantageous Effects

According to various embodiments as above, it is possible to provide a battery pack, which may allow easier inspection of the weld quality of a pack case during a welding process, and a vehicle including the battery pack.

In addition, according to various embodiments as above, it is possible to provide a battery pack, which may quantitatively determine the weld quality of a pack case during a welding process, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease of understanding the present disclosure, the accompanying drawings may not be drawn to actual scale, but the dimensions of some components may be exaggerated.

Figure 1:
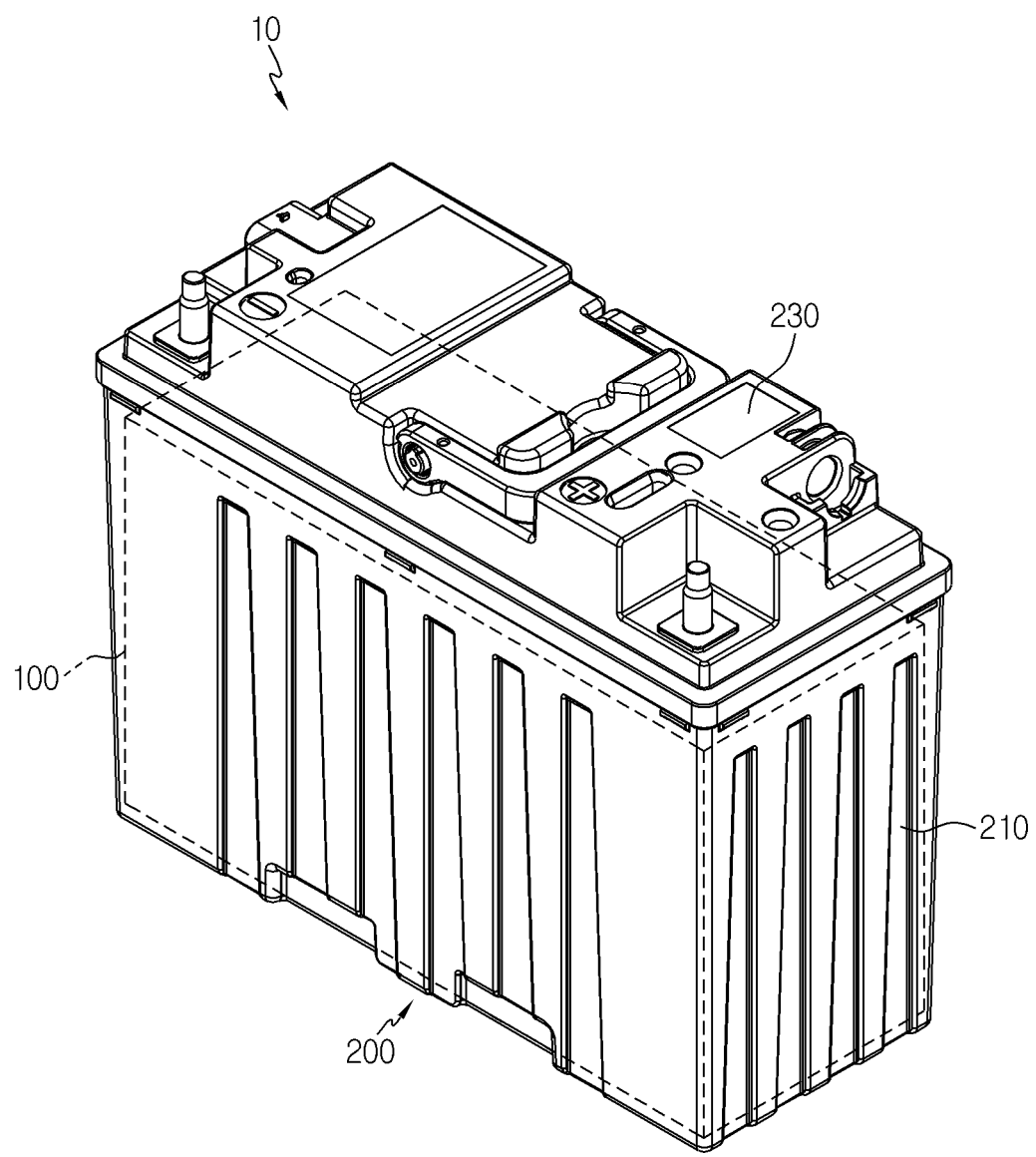
FIG. 1 is a diagram for illustrating a battery pack according to an embodiment of the present disclosure.
Figure 2:
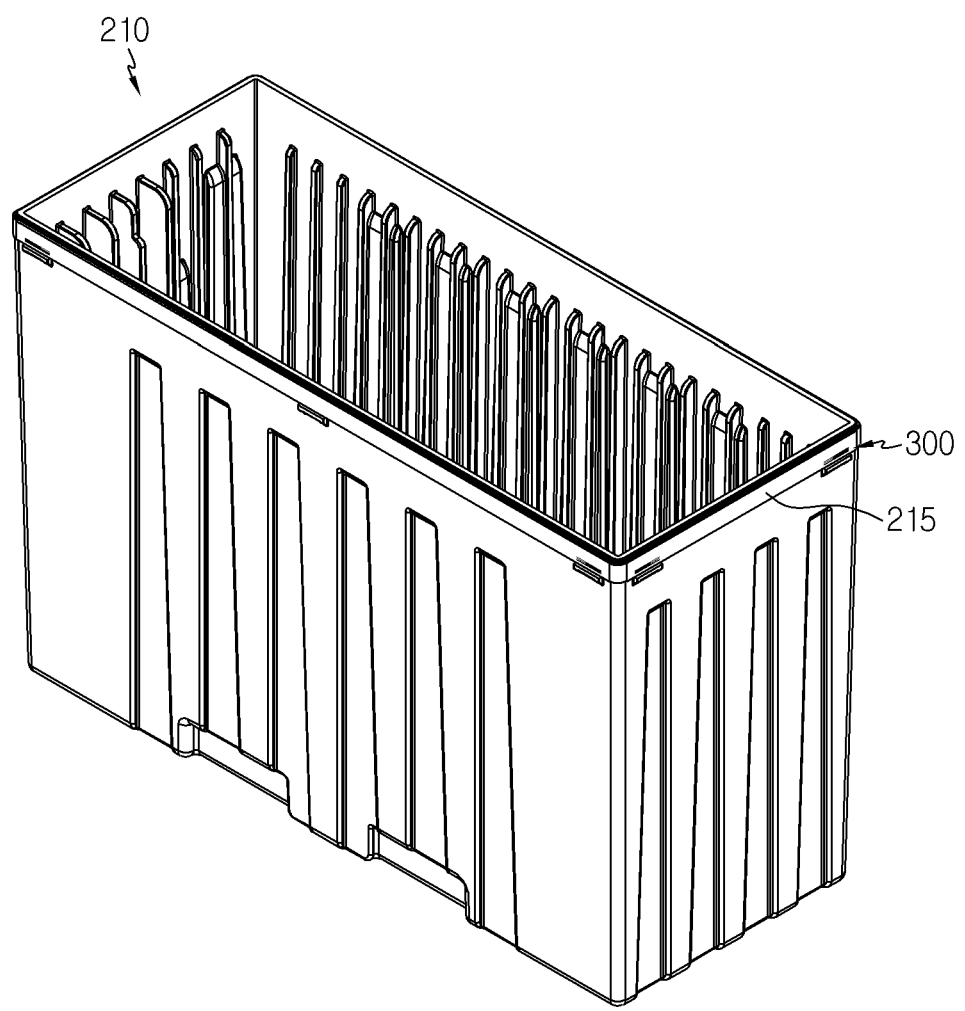
FIG. 2 is a perspective view showing a case body of a pack case, employed in the battery pack of FIG. 1.
Figure 3:
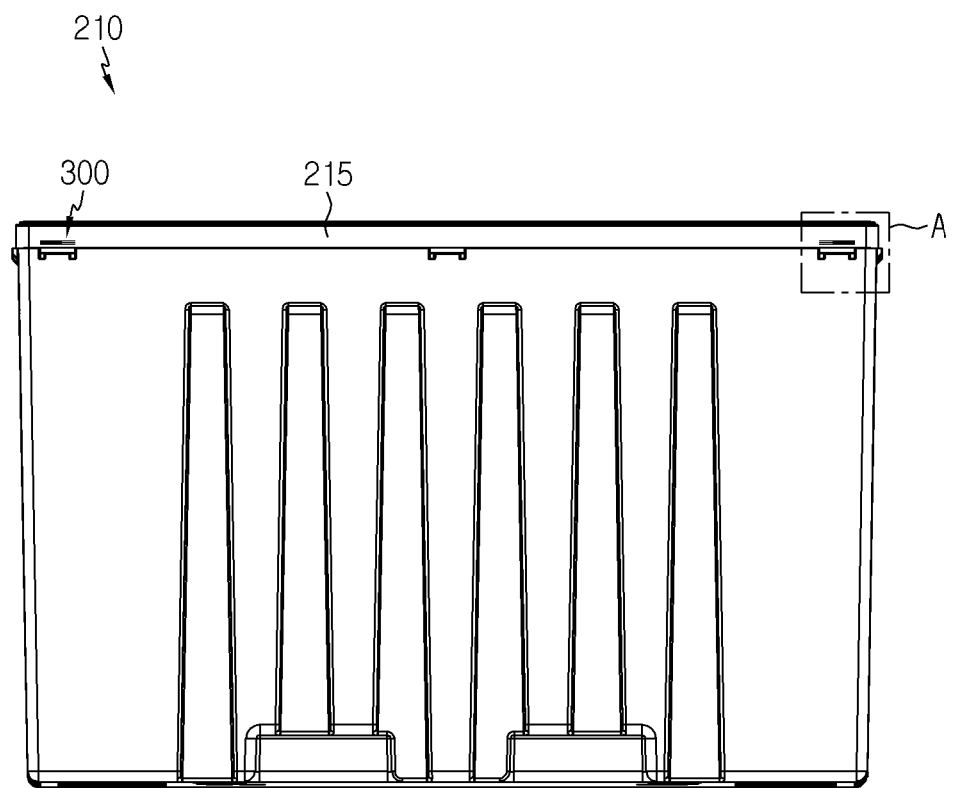
FIG. 3 is a side view showing the case body of FIG. 2.
Figure 4:
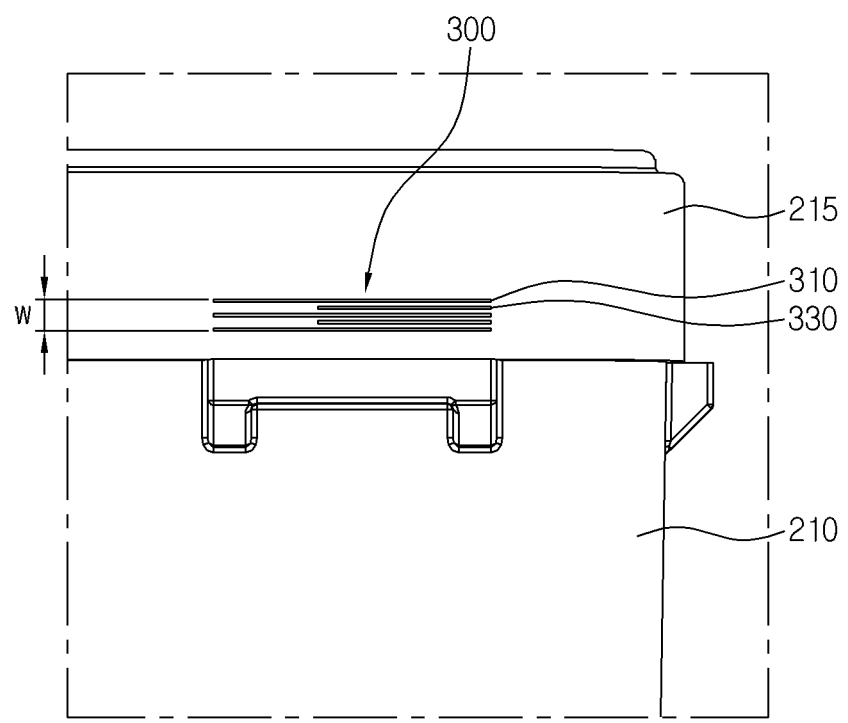
FIG. 4 is an enlarged view showing a portion A of the case body of FIG. 3.

FIG. 1 is a diagram for illustrating a battery pack according to an embodiment of the present disclosure, FIG. 2 is a perspective view showing a case body of a pack case, employed in the battery pack of FIG. 1, FIG. 3 is a side view showing the case body of FIG. 2, and FIG. 4 is an enlarged view showing a portion A of the case body of FIG. 3.

Referring to FIGS. 1 to 4, a battery pack 10 may be provided as an energy source for an electric vehicle, a hybrid vehicle, or the like. However, the present disclosure is not limited thereto, and the battery pack 10 may also be provided as a domestic or industrial energy source.

The battery pack 10 may include a battery module 100, a pack case 200, and a weld quality indicator 300.

The battery module 100 may include at least one battery cell or a plurality of battery cells. The battery cell is a secondary battery and may be provided as a pouch-type secondary battery. However, the present disclosure is not limited thereto, and the battery cell may also be a cylindrical or rectangular secondary battery.

The pack case 200 is for packaging the battery module 100 and may include a case body 210 and a case cover 230.

The case body 210 may have an accommodation space for accommodating the battery module 100. The case body 210 may be welded to a case cover 230, to be explained later, to package the battery module 100.

The welding may be performed at an upper side of the case body 210, specifically at an upper rim 215 of the case body 210. By means of the welding, the inside of the pack case 200 may be sealed.

The case cover 230 covers the upper side of the case body 210 and may be connected to the case body 210 by means of the welding to package the battery module 100 together with the case body 210. Specifically, the case cover 230 may be welded to the upper rim 215 of the case body 210.

The weld quality indicator 300 is for inspecting the accuracy of the welding, such as the quality of the welding, and may be provided on the case body 210 of the pack case 200. Specifically, the weld quality indicator 300 may be formed at the upper rim 215 of the case body 210.

The weld quality indicator 300 may indicate the accuracy of welding such as the weld quality through a visual inspection by a user. Specifically, when the case body 210 and the case cover 230 are welded, a height and/or slope of the case cover 230 is changed as a weld portion of the case body 210 is melted down, and the weld quality indicator 300 may allow the changed height and/or slope of the case cover 230 to be detected by the vision of the user.

The weld quality indicator 300 may be provided in plural, and the plurality of weld quality indicators 300 may be disposed to be spaced apart from each other by a predetermined distance along the upper rim 215 of the case body 210.

The plurality of weld quality indicator 300 may include a plurality of engraved dimensional marks 310, 330, respectively.

The plurality of engraved dimensional marks 310, 330 may have a predetermined length along a horizontal direction of the case body 210 and may be spaced apart from each other by a predetermined distance along a vertical direction of the case body 210.

The plurality of engraved dimensional marks 310, 330 may be provided as dimensional inscribed grooves formed with a predetermined depth from the case body 210. However, the present disclosure is not limited thereto, and it is also possible that the plurality of engraved dimensional marks 310, 330 have a protruding shape that may be easily inspected by the vision of the user.

The plurality of engraved dimensional marks 310, 330 may be formed at positions where the entire width W of the plurality of engraved dimensional marks 310, 330 along the vertical direction of the case body 210 may serve as an indicator for assuring the accuracy of the welding during the welding process. Accordingly, in the event that the bottom portion of the case cover 230 that is lowered by the welding is disposed within the entire width of the plurality of engraved dimensional marks 310, 330 along the vertical direction during the welding process, the user may determine that the welding has been performed to ensure the sealability.

The plurality of engraved dimensional marks 310, 330 may be formed to have at least two different lengths in the horizontal direction of the case body 210. Moreover, the engraved dimensional marks 310, 330 having different lengths may be alternately arranged in the vertical direction of the case body 210. This is to further increase the visibility to the user when the plurality of dimensioned carved portions 310, 330 are inspected by the vision of the user.

Hereinafter, the weld quality checking mechanism via the weld quality indicator 300 having the plurality of engraved dimensional marks 310, 330 will be described in more detail.

Figure 5:
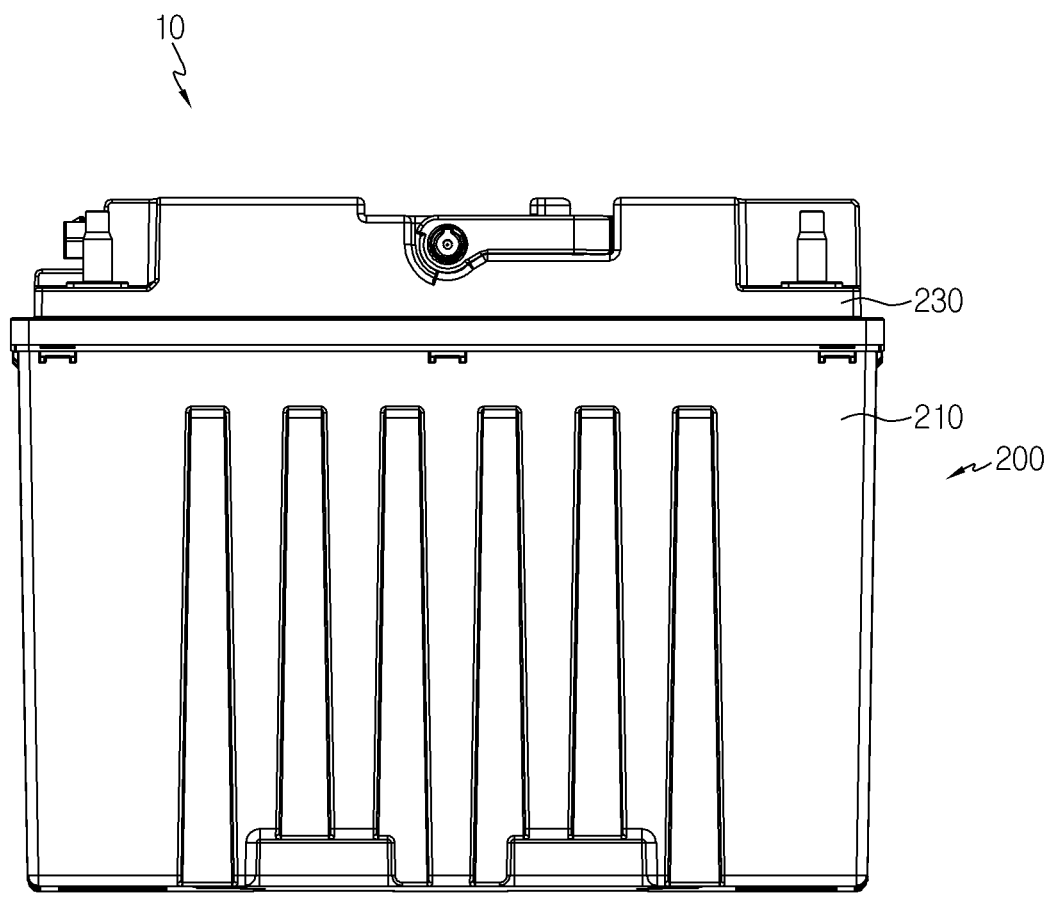
FIG. 5 is a diagram for illustrating a welding work for the pack case, employed at the battery pack of FIG. 1.

FIG. 5 is a diagram for illustrating a welding work for the pack case, employed in the battery pack of FIG. 1, and FIGS. 6 to 8 are diagrams for illustrating a process of checking the weld quality using a weld quality indicator during the welding work of FIG. 5.

Referring to FIGS. 5 to 8, in the battery pack 10, when the case body 210 and the case cover 230 of the pack case 200 are welded, at least one of height and slope of the case cover 230 may be changed to be lowered toward a lower side of the case body 210 as the welding is performed.

The user such as a worker may more conveniently inspect the changed position of the case cover 230 via the weld quality indicator 300. In this embodiment, the accuracy of the weld quality may be more conveniently checked by visually inspecting the changed position of the case cover 230 using the weld quality indicator 300.

Figure 6:
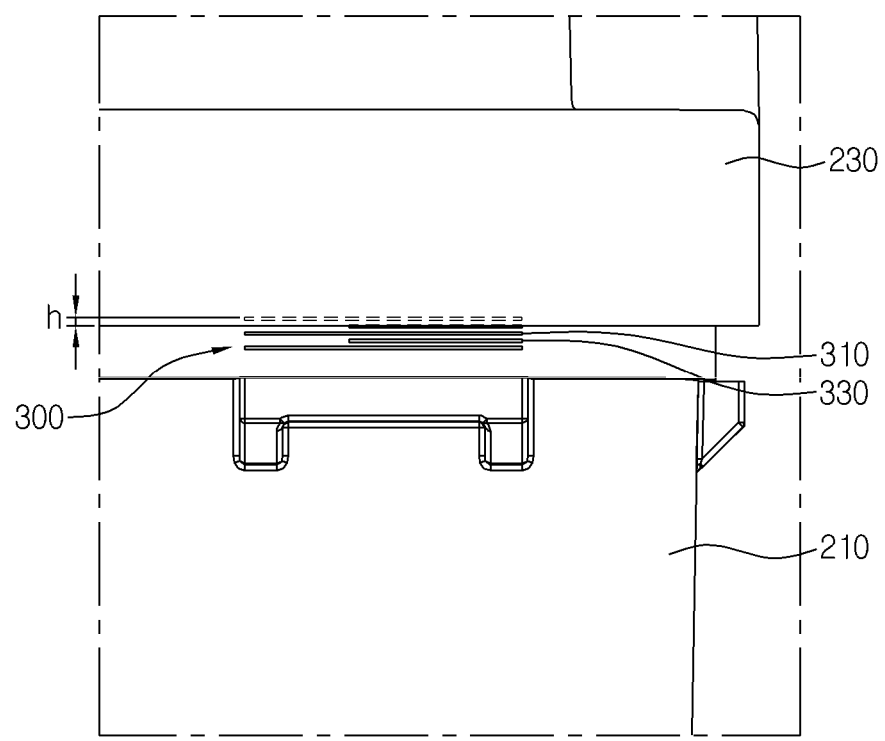
FIGS. 6 to 8 are diagrams for illustrating a process of checking welding quality using a weld quality indicator during the welding work of FIG. 5.

For example, as shown in FIG. 6, the user such as a worker may check that the welding is performed properly if the lowered height h of the case cover 230 is disposed within the full width W (see FIG. 4) of the weld quality indicator 300 and the case cover 230 is parallel to the horizontal length of the engraved dimensional marks 310, 330 of the weld quality indicator 300.

Figure 7:
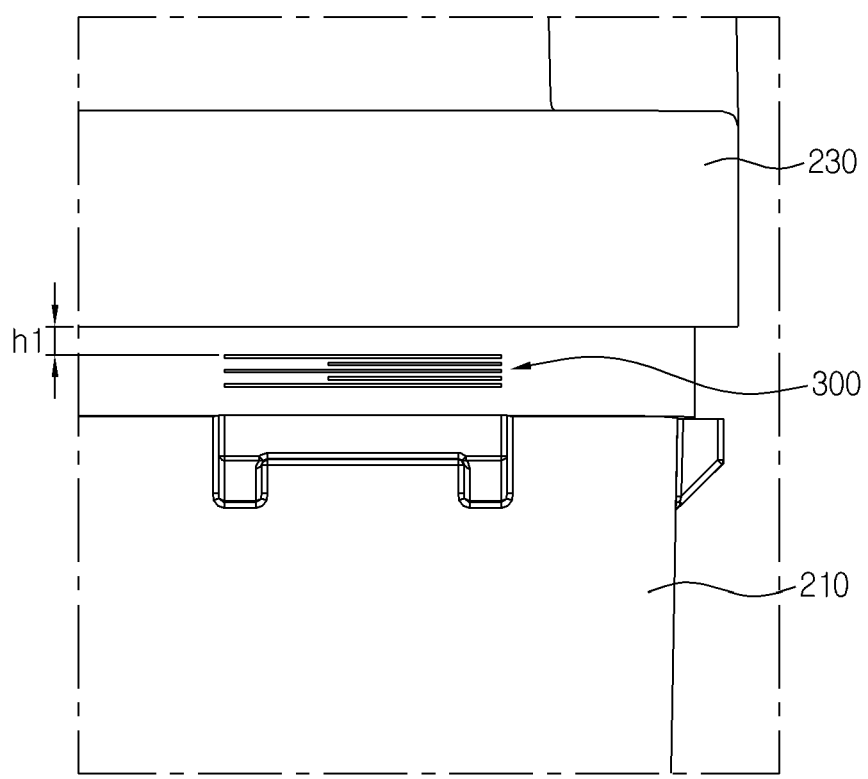

The welding is determined to be defective in the following cases. As shown in FIG. 7, if the lowered height h1 of the case cover 230 is disposed above the uppermost end of the engraved dimensional marks 310, 330 of the weld quality indicator 300, the user may inspect this by vision and determine that the welding is defective.

Figure 8:
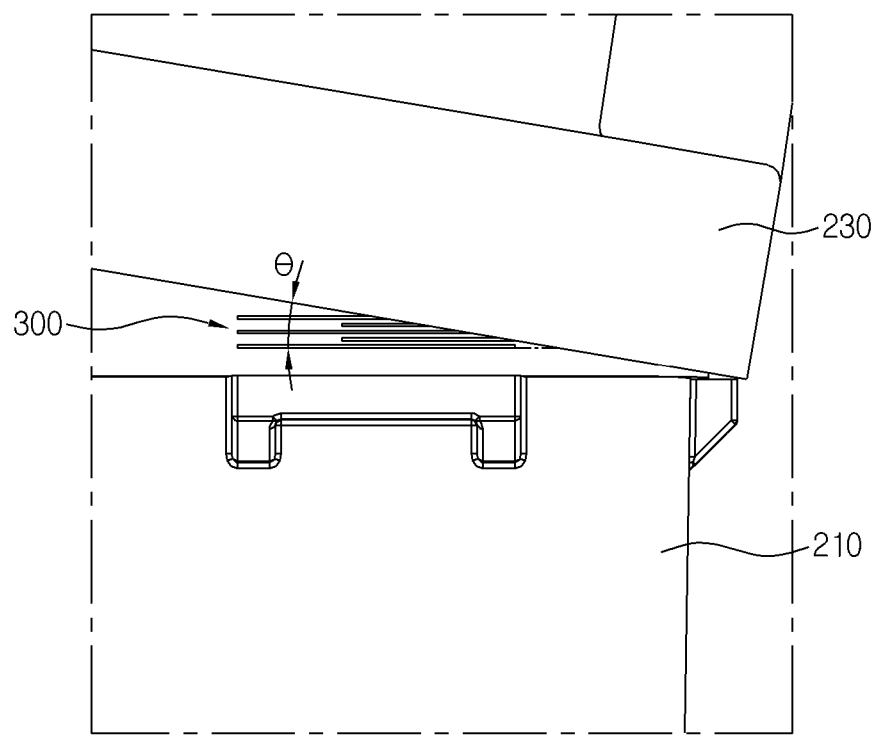

In addition, as shown in FIG. 8, if the case cover 230 is disposed to have a particular slope (θ) with respect to the engraved dimensional marks 310, 330 of the weld quality indicator 300, the user may inspect this by the vision and determine that the welding is defective.

As described above, in this embodiment, the accuracy of the welding of the pack case 200 may be inspected merely by the vision of the user such as a worker via the weld quality indicator 300.

Moreover, in this embodiment, the accuracy of the welding may be clearly determined by inspecting whether the lower end of the case cover 230 is disposed within the width range in the vertical direction of the weld quality indicator 300 and also by inspecting the slope of the lower end of the case cover 230 with respect to the weld quality indicator 300. Thus, it is also possible to quantitatively determine the accuracy of the welding via the weld quality indicator 300.

As described above, in this embodiment, since the weld quality of the pack case 200 may be immediately inspected by the vision of the user such as a worker during the welding process by means of the weld quality indicator 300 provided on the case body 210 of the pack case 200, there is no need for a post inspection process using equipment such as a separate sensor for checking the weld quality. Thus, in this embodiment, the cost and additional overall process time caused by the addition of a separate weld inspection facility may be significantly reduced.

According to various embodiments as above, it is possible to provide a battery pack 10, which may more easily inspect the weld quality of the pack case 200 during a welding process, and a vehicle including the battery pack.

In addition, according to various embodiments as above, it is possible to provide a battery pack 10, which may quantitatively determine the weld quality of the pack case 200 during a welding process, and a vehicle including the battery pack.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
   a battery module having at least one battery cell;
   a pack case having a case body for accommodating the battery module and a case cover configured to be welded to the case body to package the battery module; and
   at least one weld quality indicator provided on the case body of the pack case to inspect accuracy of welding,
   wherein the case cover is coupled to an upper rim of the case body by welding,
   wherein the at least one weld quality indicator is formed at the upper rim of the case body at a location that is a predetermined distance from an edge of the case body,
   wherein the at least one weld quality indicator includes a plurality of engraved dimensional marks formed with a predetermined length along a horizontal direction of the case body, and
   wherein a lowered height of the case cover is disposed within a full width of the at least one weld quality indicator.

2. The battery pack according to claim 1, wherein at least one of height and slope of the case cover is changed along a lower side of the case body by the welding, and
   wherein the at least one weld quality indicator allows the changed height and/or slope of the case cover to be inspected by a vision of a user.

3. The battery pack according to claim 1, wherein the plurality of engraved dimensional marks are disposed to be spaced apart from each other by a predetermined distance along a vertical direction of the case body.

4. The battery pack according to claim 1, wherein the plurality of engraved dimensional marks are formed to have at least two different lengths.

5. The battery pack according to claim 4, wherein the engraved dimensional marks having different lengths are arranged alternately.

6. The battery pack according to claim 1, wherein the plurality of engraved dimensional marks are provided as inscribed grooves formed with a predetermined depth at the case body.

7. The battery pack according to claim 1, wherein the weld quality indicator is provided in plural, and
   wherein the plurality of weld quality indicators are disposed to be spaced apart from each other by a predetermined distance along the upper rim of the case body.

8. A vehicle, comprising at least one battery pack according to claim 1.

9. The battery back according to claim 1, wherein the case cover is parallel to a horizontal length of the engraved dimensional marks of the weld quality indicator.

* * * * *